United States Patent [19]

Coughlin

[11] Patent Number: 5,010,181

[45] Date of Patent: Apr. 23, 1991

[54] PARTIALLY TREATED SHELLFISH WASTE FOR REMOVAL OF HEAVY METALS FROM AQUEOUS SOLUTION

[76] Inventor: Robert W. Coughlin, The University of Connecticut, Dept. of Chemical Engineering, Box U-139, Room 204, 191 Auditorium Rd., Storrs, Conn. 06268

[21] Appl. No.: 174,357

[22] Filed: Mar. 28, 1988

[51] Int. Cl.$^5$ .............................................. C08B 37/08
[52] U.S. Cl. .................................... 536/20; 210/668; 424/493
[58] Field of Search .................... 536/20; 210/668; 424/493

[56] References Cited

U.S. PATENT DOCUMENTS

| | | | |
|---|---|---|---|
| 2,040,880 | 5/1936 | Rigby | 536/20 |
| 3,533,940 | 10/1970 | Peniston et al. | 536/20 |
| 3,635,818 | 1/1972 | Muzzarelli | 210/807 |
| 3,862,122 | 1/1975 | Peniston et al. | 536/20 |
| 3,922,260 | 11/1975 | Peniston et al. | 536/20 |
| 4,195,175 | 3/1980 | Peniston et al. | 536/20 |
| 4,356,236 | 10/1982 | Koshugi | 536/20 |
| 4,368,322 | 1/1983 | Muzzarelli | 536/20 |
| 4,775,650 | 10/1988 | Portier | 210/691 |
| 4,800,024 | 1/1989 | Elfine | 210/668 |
| 4,804,750 | 2/1989 | Nishimura et al. | 536/20 |
| 4,833,237 | 5/1989 | Kawamura et al. | 536/55.3 |

FOREIGN PATENT DOCUMENTS

| | | |
|---|---|---|
| 53-47479 | 4/1978 | Japan . |
| 53-59700 | 5/1978 | Japan . |
| 63-17902 | 1/1988 | Japan . |
| 63-20301 | 1/1988 | Japan . |

OTHER PUBLICATIONS

Elson et al; Water Research 14:1307–1311 (1980).
Yalpani; Chitin Nat. Technol. [Proc. Int. Chitin, Chitosan], 3rd, pp. 403–406, edited by R. A. Muzzarelli et al., Plenum, NY, 1986.
Schlick; Macromolecules 19:192–195 (1986).

*Primary Examiner*—Ronald W. Griffin
*Assistant Examiner*—Nancy S. Carson

[57] ABSTRACT

A particle which is capable of removing heavy metal ions from aqueous solution, which comprises chitin having formed thereon a layer of chitosan, wherein the particle has a size of from 0.2 to 1.5 cm, and the chitosan layer on the surface thereof has a depth of form 0.01 microns to 10% of the particle diameter.

12 Claims, 6 Drawing Sheets

PARTIALLY TREATED SHELLFISH WASTE FOR REMOVAL OF HEAVY METALS FROM AQUEOUS SOLUTION

The U.S. Government has rights in this invention as a result of the investigations leading to this invention being funded in part by Interior Grant No. 14-08-001-G-1215-04 from the U.S. Department of the Interior.

BACKGROUND OF THE INVENTION

1. Field of the Invention

The present invention relates to chelation or sorption of transition metal ions by shellfish waste that has been partially treated but not fully converted to chitosan, a known chelating agent. The partially treated shellfish waste has been found to be a practical sorbent for removing metal ions from, e.g., wastewater.

2. Brief Description of the Background

Chitin, the second most abundant natural biopolymer (after cellulose), is a significant structural component in the shells of crustaceans (e.g., crabs, lobster and shrimp), in the exoskeletons of insects and in the cell walls of many microbes and higher fungi. Chitin is a polysaccharide consisting predominantly of unbranched chains of β-(1,4)-2-acetamido-2-deoxy-D-glucose (also known as N-acetyl-D-glucosamine) residues. It may also be regarded as a derivative of cellulose, in which the C-2 hydroxyl groups have been replaced by acetamide residues, and it resembles cellulose in many of its properties. Its occurrence in lower animals and plants, and its isolation are described in the following references:

A. G Richards, *The Integument of Arthropods* (University of Minnesota Press, Minneapolis, 1951); F. von Wettstein, *Handbuch der systematischen Botanik* (F. Deuticke, Leipzig and Vienna, 4th ed., 1933); Hackman, *Aust. J. Biol. Sci.* 7, 168 (1954); Horowitz et al., *J. Am. Chem. Soc.* 79, 5046 (1957); Dweltz, *Biochim. Biophys. Acta* 44, 416 (1960); 51, 283 (1961); Carlstrom, ibid. 59, 361 (1962); Ramachadran, Ramakrishman, ibid. 63, 307 (1962); Foster, Webber, *Advan. Carbohyd. Chem.* 15, 371–393 (1960); C. Jeuniaux, "Chitinous Structures" in *Comprehensive Biochemistry* vol. 26c, M. Florkin, E. H. Stotz, Eds. (Elsevier, New York, 1971) pp. 595–632.

Chitin is an amorphous solid which is practically insoluble in water, dilute acids, dilute and concentrated alkalies, alcohol and other organic solvents. It is soluble in concentrated HCl, $H_2SO_4$, 78–97% $H_3PO_4$, and anhydrous HCOOH.

In the U.S. and most other countries, chitin is an essentially unutilized resource and even a significant waste problem for the shellfish industries. The amount of chitin potentially available from seafood wastes in the U.S. has been estimated at between 5000 to 8000 tons per year by Hattis and Murray (Industrial Prospects for Chitin From Seafood Wastes, MIT Seagrant Report No. 27, MIT, Cambridge, Massachusetts, August 1976).

It has been recognized that the product formed by deacetylating chitin has interesting and potentially useful properties. Although chitins may occur in nature in a slightly de-acetylated form, that which has been purposely and substantially de-acetylated is usually called chitosan. One property of chitosan is its ability to bind certain metal ions at least some of which binding may be by chelation. Chelation occurs through the free amino groups. To the inventor's knowledge, no careful study of chitosan has been performed to assess its potential as a practical, economically competitive material for use in ion exchange and chelation.

Although it serves as a good chelating agent, relatively pure chitosan is expensive to produce. Pure chitosan is produced by long and severe chemical treatment of a raw material such as crab shells. Purification of, e.g., shrimp or crab shells involves removing protein (often using enzymes) and minerals to leave behind the pure acetamido-polysaccharide; the latter material is then deacetylated by hydrolysis to produce the aminopolysaccharide chitosan. A typical prior art method for producing chitosan involves preliminary treatment of shellfish waste with a strong mineral acid (e.g., HCl) which decalcifies the shells, followed by treatment with strong caustic at elevated temperatures for about 24 hours to remove protein and all acetyl groups.

Common among most of the prior art methods to produce chitosan has been the desire to remove most or all of the acetyl groups from chitin, to result in a relatively pure chitosan, which is used as a chelating agent, among other uses.

Unlike these prior art methods, the present invention involves treating chitin in a relatively mild manner such that it is hydrolyzed to chitosan only partially and presumably only on the outer surfaces of the particles. The present materials are economical to produce since the treatment is quite mild, and yet, surprisingly, this partially treated material possesses chelating ability which is nearly equal to that of the more exhaustively treated material, and further, it exhibits enhanced susceptibility to elution of chelated metal ions. The intention underlying such mild treatment is to produce a lower-value-added sorbent from shellfish waste at lower cost.

Some of the prior art processes for treatment of chitin to result in a useful product are summarized hereinbelow. None of them discusses deacetylation of chitin to chitosan only on the surface of the particles as in the present invention.

Rigby, U.S. Pat. No. 2,040,879, is directed to substantially deacetylated chitin, the structure of which is nearly completely undegraded. According to Rigby et al, chitin is produced by boiling shell waste in 1% soda ash for 6 hours, washing, treating with 5% HCl until all salts have been removed, washing, boiling in 1% soda ash and detergent for 8 hours, and washing. The chitin so produced is then deacetylated to produce chitosan. The deacetylation step involves treatment with 40% sodium hydroxide at 110° C. for 4 hours, followed by draining and washing. The process of Rigby has as one object reduced degradation of the backbone of the chitin or chitosan polymer.

Hung, Science Reports of the National Taiwan University, No. 7, pages 56–63, December, 1977, is directed to production of chitin and chitosan from shellfish waste by various treatments. Adsorbents for metal ions were prepared by treating the shells of 4 species of shrimp and 1 species of crab with various reagents, then grinding the shells into fine powders (100/200 mesh). The various pretreatments used were: A-80% ethanol for 24 hours, B-13.5% HCl for 24 hours, C-same as B but with additional treatment in 5% NaOH at 85°–90° C. for 135 minutes three times, D-same as A but with additional treatment in 5% NaOH at 85°–90° C. for 135 minutes. One major difference between this reference and the present invention occurs in the size of the particles involved. Hung involves very small particles, on the order of 75 to 100 μm. The particles in the present invention are much larger since they are not ground as in Hung. The treatment process of chitin to produce chitosan is also different in Hung. The reference does not discuss a process which deacetylates chitin only on the surface.

Peniston et al, U.S. Pat. No. 3,553,940, is directed to a method of treating an aqueous medium with chitosan and derivatives of chitin to remove impurities. The treatment of chitin in this patent involves the following steps: shell waste is treated with HCl at room temperature for 2 to 3 hours to remove calcium carbonate, and is washed. Then the material is heated in 3% sodium hydroxide for 2 hours at 100° C. and washed. The resulting product is then bleached with potassium permanganate followed by oxalic acid solution, and washed. Finally, the resulting material is treated with 40% sodium hydroxide at 150° C. to remove some of the acetyl groups. The treatment time is not specified.

Peniston et al, U.S. Pat. No. 4,195,175, is directed to a process for the manufacture of chitosan in which chitin is treated with 35 to 50% sodium hydroxide solution, heated to 40° to 80°, air is expelled, and the mixture is held at 40° to 80° C. for 160 to 40 hours. The product is then washed and dried to produce a chitosan product.

Peniston et al, U.S. Pat. No. 3,862,122, is directed to a method of producing chitosan from chitin, which involves deproteination of shell waste by countercurrent contacting with dilute sodium hydroxide (0.5–2%) at 50° to 70° C. for 1 to 4 hours. The material is then simultaneously decarbonated and deacetylated by countercurrently contacting with strong sodium hydroxide (30 to 50%) at 120° to 150° C. for about 1 hour.

Broussignac, Chemical Abstracts 69:59578x (1968), produces chitosan by treatment of chitin in dilute (5%) HCl for 24 hours, followed by deacetylation by treatment with 50% potassium hydroxide, 25% ethanol and ethylene glycol at 120° C. for 16 hours.

Table 1 below summarizes the treatment regimens involved in some of the pertinent references mentioned herein. For comparative purposes, an example of a treatment method of the present invention is also given.

TABLE 1

Condition and Amounts of Reagents Employed (per part of shell waste or of chitin)

| Reference | Step | | |
|---|---|---|---|
| | Deproteination | Demineralization | Deacetylation |
| U.S. Pat. No. 4,195,175 | — | — | 72 hr., 70° C., 5 parts 50% NaOH per part purif. chitin |
| U.S. Pat. No. 3,862,122 | — | 80–90° C., 30 min 23 parts 10% sucrose per part deproteinated shells | 120–150° C., 1 hr., 10 parts 40% NaOH per part deproteinated shells |
| U.S. Pat. No. 3,533,940 | 100° C., 2 hr. 3% NaOH - no information on amounts | room temp., 2–3 hr. N HCl - no information on amounts | 150° C., 40% NaOH - no information on time or amounts |
| U.S. Pat. No. 2,040,879 Ex. 1 | boil 6 hr., 1% soda ash, boil again 8 hr. 1% soda | room temp., 5% HCl - no information on amounts | 110° C., 40% NaOH - no information on time or amounts |

TABLE 1-continued

Condition and Amounts of Reagents Employed (per part of shell waste or of chitin)

| Reference | Step | | |
|---|---|---|---|
| | Deproteination | Demineralization | Deacetylation |
| U.S. Pat. No. 2,040,879 Ex. 2 | ash + detergent steam heat, 4 hr. 8 parts ½% soda ash, 3 separate treatments of 4 hrs. each | room temp., overnight, 8 parts 1% HCl | 115° C., 6 hr. 48 parts 40% NaOH |
| Present method (Example) | — | room temp., 1 hr, 5% HCl | 50% NaOH 90° C. 1 hr. (results in some deproteinization also) |

Additional patents and references which are related to the present invention are listed hereinbelow. None of them appears to disclose a process wherein chitin is deacetylated to chitosan only on the surface, as in the present invention.

Rigby, U.S. Pat. No. 2,072,771;
Maltz, U.S. Pat. No. 4,436,731;
Nagyvary, U.S. Pat. No. 4,363,801;
Komiyama et al, U.S. Pat. No. 4,512,968;
European Patent 0065491;
British Patent 2,129,300;
European Patent 0,028,126;
British Patent 2,026,516;
Chemical Abstracts 106:14375v;
Chemical Abstracts 68:62641x;
Chemical Abstracts 74:79292f;
Chemical Abstracts 83:12563n;
Chemical Abstracts 83:12707n;
Chemical Abstracts 84:76100n;
Chemical Abstracts 94:32563t;
Chemical Abstracts 87:172265c;
Chemical Abstracts 97:4611a;
Chemical Abstracts 98:5675g; and
Chemical Abstracts 95:25438y.

In spite of the above-described prior art, there has remained a need for new and more economical ways of chelating metal ions using shellfish-derived waste.

SUMMARY OF THE INVENTION

Accordingly, an object of the present invention is to provide a shellfish-derived waste material which has been treated by relatively mild, inexpensive treatment, and yet which exhibits an ability to effectively chelate metal ions;

It is another object of the present invention to provide a chitin product which has been deacetylated only on the surface thereof to chitosan, which can thereby chelate metal ions relatively effectively, and which is capable of having the metal ions eluted from the particle more readily than prior art particles;

It is yet another object of the present invention to provide a method of removing heavy metal ions from water by use of economically produced chitin/chitosan material;

It is yet another object of the present invention to provide a packed column containing particles of a chitosan product which has been economically produced and which exhibits an ability to effectively chelate metal ions.

According to the present invention, the above and other objects of this invention which will hereinafter become more readily apparent, have been achieved by a chitin particle which has been deacetylated only on the surface thereof. In an exemplary embodiment, the treatment comprises: decalcification by contacting shellfish waste with dilute mineral acid for from about ½ to 3 hours, and washing, followed by deacetylation and deproteinization by treating with 35 to 55% alkali hydroxide at 70° to 100° C. for from ½ to 3 hours and washing. Such treatment decalcifies and deacetylates the chitinous starting material only on the surface thereof, to a depth of about 0.1 to 0.01 $\mu$m.

BRIEF DESCRIPTION OF THE DRAWINGS

A more complete appreciation of the invention and many of the attendant advantages thereof will be readily obtained as the invention becomes better understood by reference to the following detailed description when considered in connection with the accompanying drawings, wherein.

DESCRIPTION OF THE PREFERRED EMBODIMENTS

Figure 1:
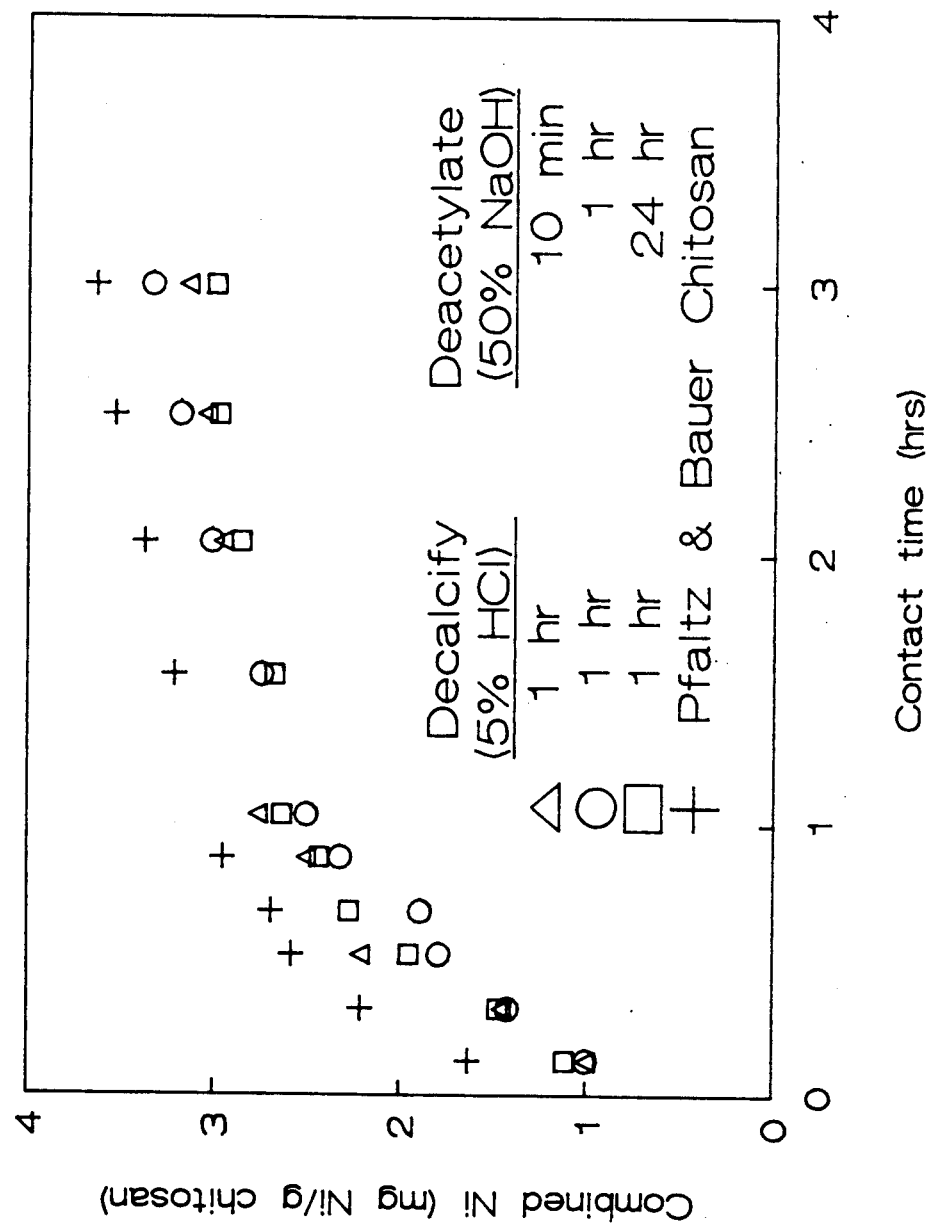
FIG. 1 compares the relative capacities and rates of absorption of Ni by partially treated shellfish waste (PTS) and by pure chitosan.

According to the present invention, chitin is deacetylated only on the surface thereof to chitosan, by relatively mild treatment. Such particles have not been described as useful in the prior art. The treatment can involve decalcification of chitinous material, especially shellfish waste, by contacting the shellfish waste with dilute mineral acid for from ½ to 3 hours, at approximately room temperature. In this first step, the concentration of dilute acid may range from 3% to 10%, preferably 4% to 8%, most preferably 5%. The acid may be, for example, a mineral acid such as hydrochloric acid, hydrobromic acid, hydroiodic acid, nitric acid, or sulfuric acid. Low molecular weight organic acids such as formic, acetic or chloroacetic acids can also be used in addition to mineral acids. The treatment time can range from ½ hour to 3 hours, preferably ½ hour to 2 hours, most preferably approximately 1 hour. The temperature for this treatment step may be approximately room temperature, preferably 20° to 30° C., most preferably about 25° C. After this step, the resulting decalcified shellfish waste material may be washed with aqueous solution, and partially dried, if necessary.

The next step deacetylates and deproteinizes the decalcified shellfish waste. This step involves treatment of the shellfish waste with a basic aqueous solution; usually about 30 to 60%, preferably 40 to 60% alkali hydroxide. The alkali hydroxide can be, for example, potassium hydroxide or sodium hydroxide, most preferably sodium hydroxide. The treatment is conducted at an elevated temperature, preferably from about 60° C. to 110° C., more preferably 80° to 90°, most preferably about 90° C. The treatment is conducted for a period of time which ranges from about 10 minutes to 3 hours, preferably ½ hour to 2 hours, most preferably approximately 1 hour. After the deacetylation/deproteinization step, the treated shellfish waste material may be washed, such as with an aqueous wash, followed by partial or complete drying.

The above treatment results in a chitin particle which is deacetylated to chitosan on the surface thereof, to a depth ranging approximately from 0.01 $\mu$m to about 10% of the particle diameter. Such particles have not been described by the prior art. The usefulness of these particles for chelation is surprising in view of the very mild treatment which has been conducted.

In addition to the above-described methods, other mild treatment methods could also produce particles having only the outer surface thereof deacetylated. To determine whether particles produced by another method satisfy the requirements of the present particles, the particles could be examined by an analytical technique such as energy dispersive X-ray analysis, as described in greater detail hereinbelow, particularly in connection with FIG. 6.

An experimental observation germane to the present invention is that the particles produced according to the present invention sorb metal ions. Because of the known chelation properties generally attributed to chitosan which is elaborated in the outer regions of the particles of the instant invention, the term chelation is used frequently thoughout this disclosure. However, the amino groups of chitosan have ion exchange properties as well as chelation properties. Some non-specific adsorption may occur as well. Hence, sorption by the particles of the present invention may also involve mechanisms other than chelation (e.g. ion exchange) even in instances which are referred to herein using the term chelation.

The shellfish waste starting material of the present invention may be shells obtained from a variety of fresh or sea water animals or plants. The only requirement is that these materials contain a significant amount of chitin. For example, the shellfish which may be used can be crabs, lobsters, prawns, krill, shrimp, crayfish, etc. Preferred materials can be derived from crabs, lobsters, and shrimp, most preferably crabs. By "shellfish waste", is meant the material left over from the above animals after removal of the majority of the edible, and other soft body parts. A preferred shellfish waste is obtained from a New England Red Crab after removal of edible portions in a crabmeat processing factory. The shellfish waste material consists of particles having a size of from 0.2 to 1.5 cm, that is 2,000–15,000 $\mu$m. The shellfish waste material can preferably be obtained directly from a meat processing plant, such as a crab meat processing plant. No additional grinding of this material is required before treatment according to the present invention. A preferred particle size is from about 0.5 to 1 cm. Grinding to fine powders is not desirable according to the present invention. Grinding itself is relatively costly and energy consuming. Moreover, while the ground particles will have a higher surface area resulting in a higher absorptive capacity, they will also exhibit ruptured chemical bonds that may bind metal ions irreversibly, thereby interfering with regeneration of the sorbent by elution of the metal ions. Small particles formed during grinding will also be more difficult to separate (e.g. by filtration) from the treatment reagents and the metal-ion solutions to be purified.

The treated materials according to the present invention have the advantages that they are both able to adsorb (chelate) metal ions relatively readily from solution, and they are also able to have the adsorbed (chelated) metal ions eluted therefrom more readily than more severely treated particles. The metal ions which are able to be adsorbed from solution by chelation by using the present materials include, for example, $Ni^{2+}$, $Cr^{3+}$, $Hg^{2+}$, $Co^{2+}$, $Ag^+$, $Pb^{2+}$, $Ti^{3+}$, $Fe^{3+}$, $Hg^{2+}$, $Zn^{2+}$, $UO_2^{2+}$, $Mn^{2+}$, $Cr^{6+}$, $Cu^{2+}$ and perhaps $Cd^{2+}$. Preferred ions are those of nickel and copper. Generally, solutions which can be treated with the materials of the present invention contain up to several thousand ppm of a metal ion (e.g., 10 ppm to 5000 ppm). The concentration of the ion can be reduced to, for example, <10 ppm (e.g., 0.5 to 5 ppm) by treatment with the partially treated shellfish material of this invention.

In contrast to the procedures described in the prior art which consume much time, labor and chemical reagents, the products are treated by, for example, 1 hour in 5% HCl at room temperature, followed by washing and treatment for 1 hour in 50% NaOH at 90° C. In one embodiment, about 7 parts of each reagent were used for each part of shells. The resulting product is able to remove metal ions from solution about as effectively as much more exhaustively treated shell waste. The relative ion-absorbing capabilities of various materials, including commercially obtained chitosan, are evident in FIG. 1.

Figure 6:
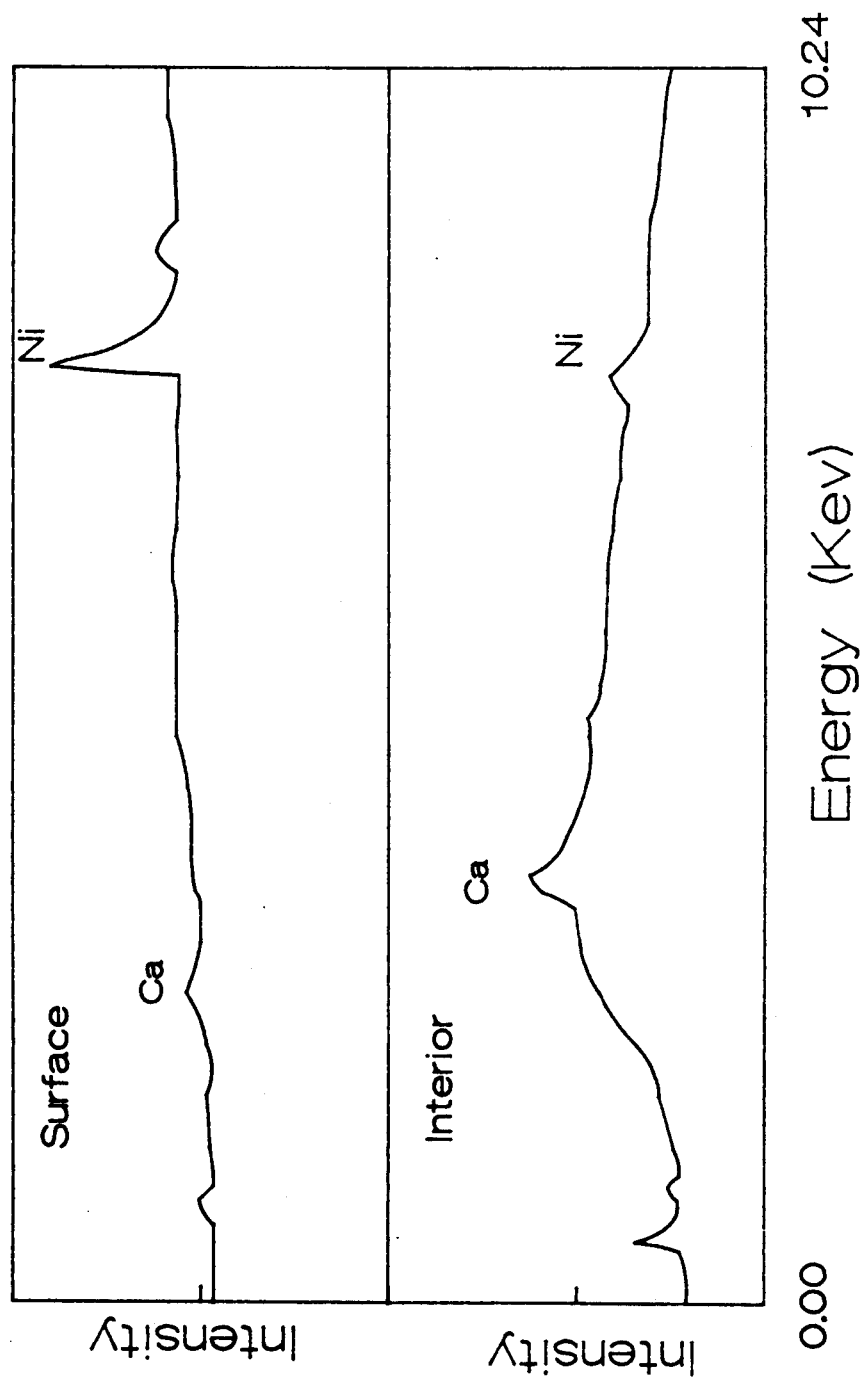
FIG. 6 shows an X-ray analysis of calcium and nickel in PTS which has been used to chelate nickel from solution.

The product obtained by the simple, short and mild treatment of shellfish waste according to the present invention may be described as having sites for ion exchange, chelation or ion absorption at and near its outer surface, but not substantially in its interior. Furthermore, calcium has been removed from its outer surface but not substantially from its interior. FIG. 6 shows an energy dispersive X-ray analysis of the surface and of the interior of a particle of shell waste that has been treated by the present process and then contacted with a solution containing nickel ions. The presence of nickel at the surface but not the interior should be noted; likewise, the absence of calcium from the surface but not the interior.

The overall degree of deacetylation for the particle is very small, such as less than 20% (e.g., 5–19%).

Table 2 summarizes data obtained by ten cycles of chelation and elution of Ni by PTS.

TABLE 2

Elution of Nickel From Shellwaste (Batch Treatment) basis = 1 g

| Cycle no. | Combined Ni (mg) | Ni eluted (mg) 30 ml elution fractions | | Total Ni eluted (%) |
|---|---|---|---|---|
| | | 1 | 2 | |
| 1 | 14.7 | 10.7 | 0.4 | 77 |
| 2 | 13.0 | 7.4 | — | 57 |
| 4 | 14.7 | 8.2 | 0.4 | 58 |
| 5 | 14.7 | 6.8 | 0.4 | 50 |
| 7 | 13.0 | 5.8 | — | 45 |
| 10 | 11.3 | 3.5 | 0.4 | 40 | cycle = sorption + elution + regeneration
sorption = 500 ppm Nickel solution (100 ml)
eluant = 1N Sulfuric acid (30 ml)
regeneration = 1N Sodium Hydroxide (30 ml)

In a regeneration step after each elution the amino groups were deprotonated using 1N NaOH. The data of Table 2 indicate relatively constant chelation capacity per cycle over the ten cycles studied. However the fraction of Ni recovered by each elution decreased steadily with each cycle. The latter behavior is believed to arise from gradual degradation of the chitosan on the outer regions of the particles with simultaneous gradual and progressive deacetylation and decalcification toward the interior of the particles; on each subsequent cycle Ni may have penetrated deeper into the particles and therefore eluted more slowly and less extensively in a fixed elution time.

The major advantage of crushed particles of chitinous shells with chitosan elaborated only in the outer layers would be lower cost compared to using pure chitosan. The pellicular layers of chitosan on the shell particles can be formed using shorter and less drastic treatment with the use of much smaller amounts of chemical reagents. An added advantage is that the chitosan is formed where it is most effective, namely in the outer periphery of the particles, thereby avoiding the slow diffusive process by which metal ions usually have to reach chitosan deep in the interiors of pure chitosan resin particles used for ion-exchange or chelation. Production of chitosan only on the outer periphery of the particles is considerably faster and requires much smaller amounts of chemicals than production of pure chitosan.

The particles of the present invention may be used to adsorb or chelate the above-described metal ions from aqueous solution, or may also be used in an ion exchange capacity. The adsorption columns packed with the treated particles of the present invention can range in diameter from about a centimeter to several feet, depending on the size of the particulate packing employed and the desired liquid flow rates through the column. Column length can range from a few inches to as much as 20–30 ft., depending on the amount of sorbent to be placed in the column, the desired sorption capacity of the column, the concentrations and flow rates of the liquid to be treated, and the space available where the column is to be installed. Based on some preliminary design estimates made by the inventor, it appears that a suitable column size for treating waste rinse waters from small electroplating plants is about two feet in diameter and about 20 feet long. Several such columns may be required for a single plant. After elution of chelated or adsorbed metal ions, the particles may be reused a plurality (e.g. 2–10) of times, until the particles are no longer capable of chelating or adsorbing a desired amount of metal ions. molecules such as proteins. Ion exchange columns find wide application in separating and purifying such molecules and columns containing the particles of the present invention can serve as ion-exchange columns. The particles of this invention can be used for chelation, ion-exchange and non-specific adsorption. In Chitin by R. A. A. Muzzarelli, Pergamon Press, N.Y. (1977), uses of chitosan in chelation and ion-exchange are described, including use in ion-exchange chromatography (pp. 183–190), chelation chromatography (pp. 193–194) and affinity chromatography (pp. 195–204).

Classic references on ion-exhcnage are:

F. Helfferich, *Ion Exchange*, McGraw-Hill, N.Y. (1962), and

W. Rieman and H. F. Walton, *Ion Exchange in Analytical Chemistry*, Pergamon Press, N.Y. (1970).

The figures are discussed in greater detail hereinbelow, since they exemplify and expand upon the above disclosure.

Calcium salts are distributed relatively deep within the endocuticle of a crab shell and exhaustive acid treatment is required to decalcify throughout the structure. The present mild acid treatment does not significantly decalcify deep within the cuticle. Caustic treatment removes the epicuticle, the pigmented layer and the epidermis as well as protein interlaminated with calcium carbonate and chitin within the endocuticle. Again, exhaustive caustic treatment is required to remove protein throughout the endocuticle. The present mild caustic treatment is believed to remove only the epidermis, the epicuticle, the pigmented layer and some protein at shallow depths within the endocuticle.

FIG. 1 compares the relative capacities and rates of sorption of Ni by partially treated shellfish waste (PTS) and by pure chitosan purchased from Pfaltz and Bauer Chemical Company. The chelation rate experiments of FIG. 1 were performed in a beaker using 150 ml of stirred nickel solution dosed with chitosan. The starting solution (volume=150 ml, concentration=1000 ppm) was prepared using nickel sulfate. The chitosan dosage was 3 g of PTS or P&B per 150 ml of solution. Experimental conditions were: 25° C., initial pH=6.6 final pH=7.2. Periodically, 1 ml of solution was removed for assay by atomic absorption spectrophotometry. It is evident that there (, are only small differences in behavior between the pure chitosan and three samples of PTS deacetylated for 10 minutes, 1 hour and 24 hours, respectively; each sample of PTS had been decalcified in HCl for 1 hour before deacetylation. The initial concentration of Ni in solution was 1000 ppm and the dosage was 1.0 g of chitosan or waste per 100 ml of Ni solution for the experiments of FIG. 1 which were performed at room temperature (about 25° C.).

Figure 2:
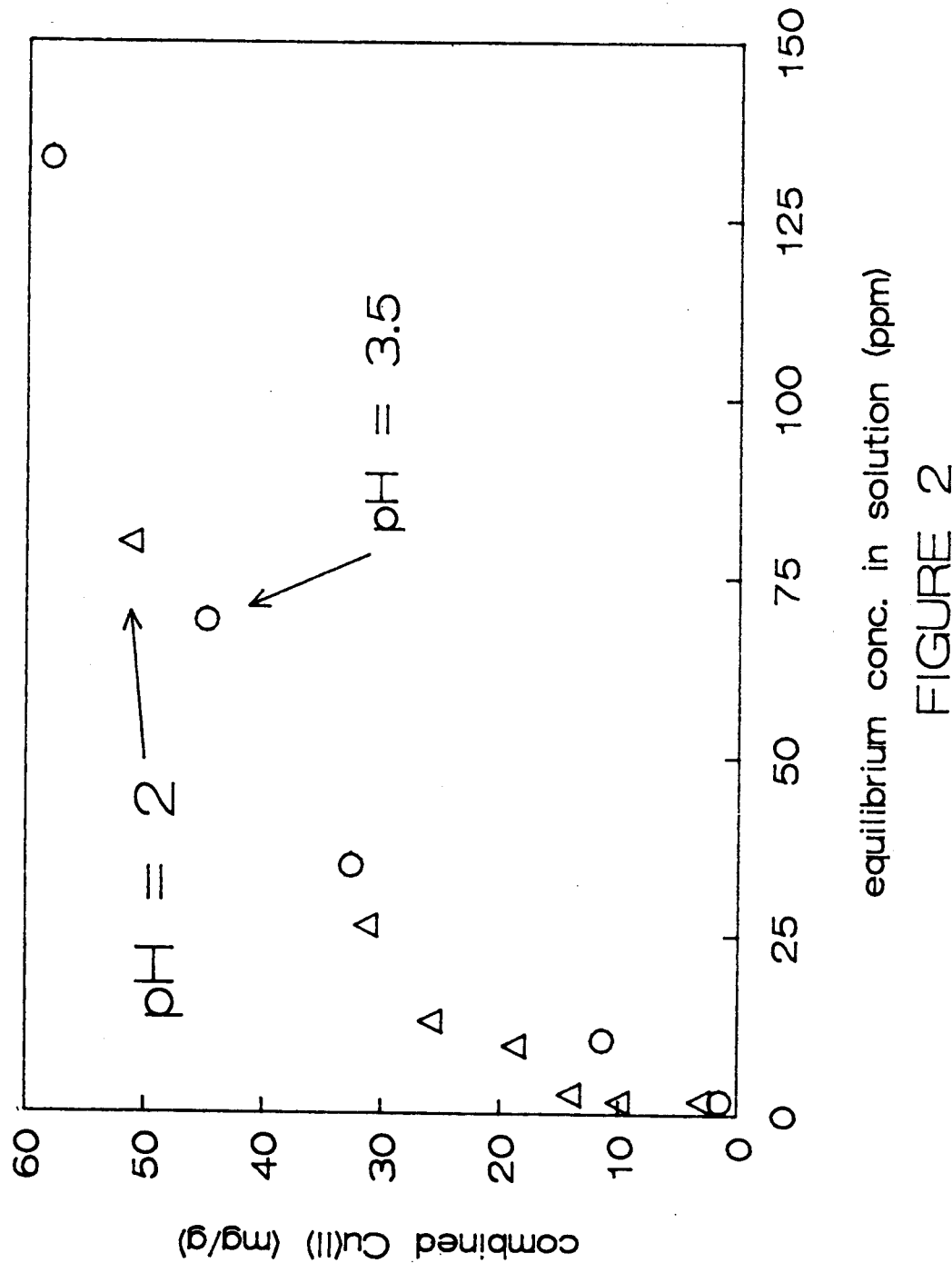
FIGS. 2 and 3 show equilibrium isotherms for copper and nickel on partially treated shellfish waste deacetylated for 1 hour.
Figure 3:
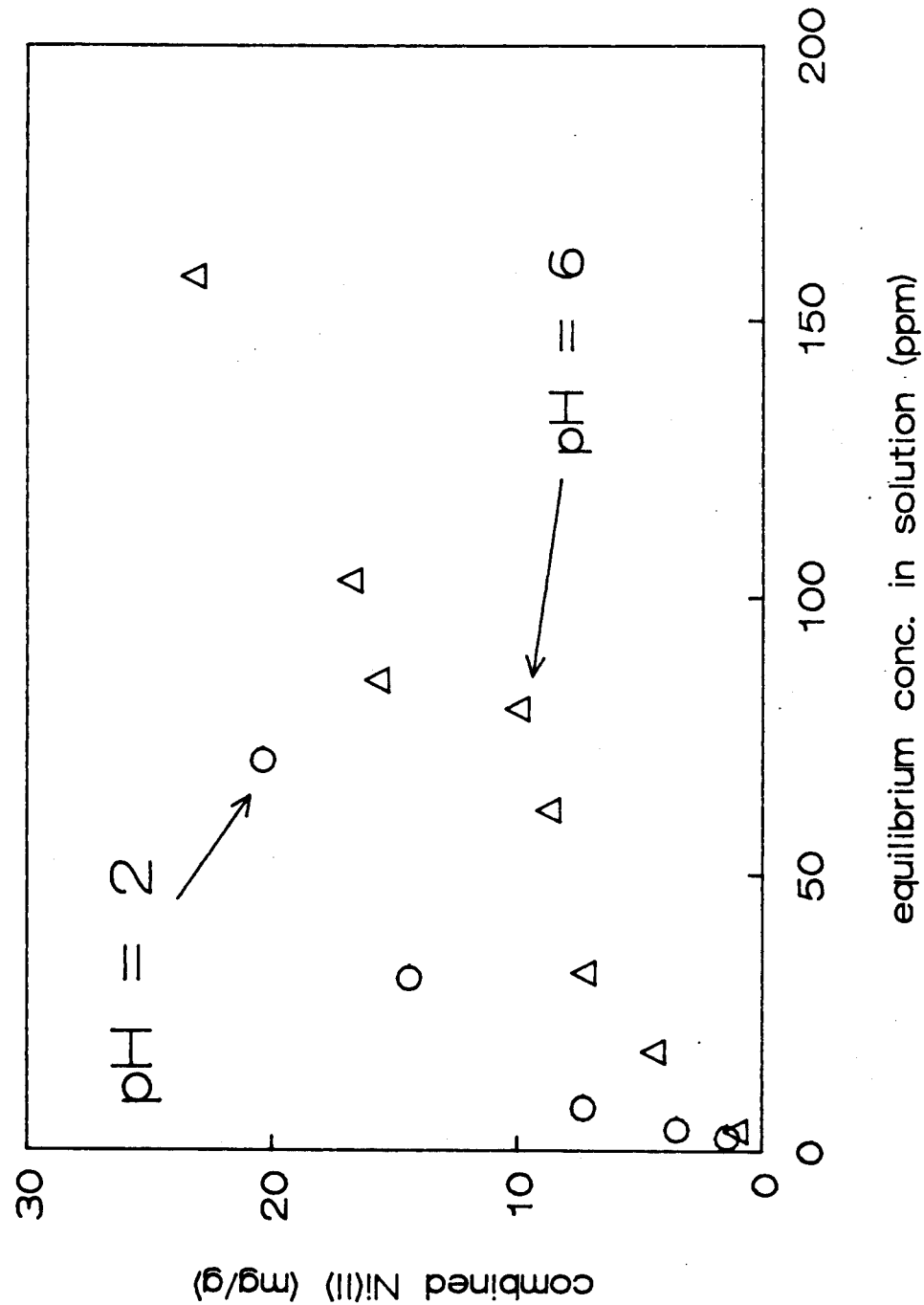

FIGS. 2 and 3 show equilibrium isotherms (temperature=25° C.) for Cu and Ni on PTS deacetylated for 1 hour. Here the influence of pH is evident; higher pH favors increased chelation up to about pH=2. However, elution is accomplished by lowering pH to 1.5. Elution at very low pH may be caused by protonation of the amino groups of chitosan. The pK of chitosan is 6.3. The experiments of FIGS. 2 and 3 were performed by adding 1.0 g of PTS to 100 ml of solution of starting concentrations ranging from 10 to 500 ppm of metal ion. Contact time was 8 hr.

Figure 4:
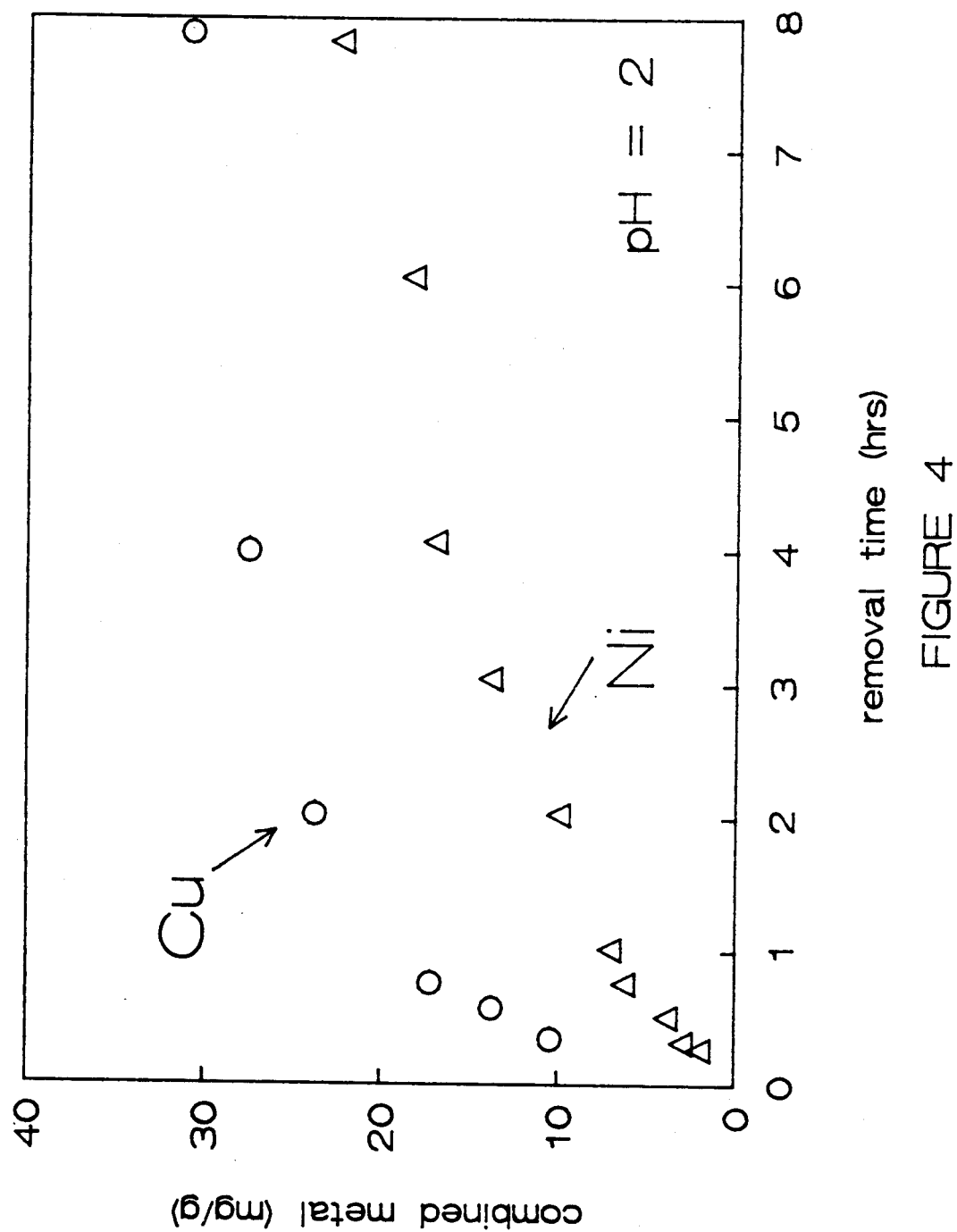
FIG. 4 shows equilibrium chelation isotherms for copper and nickel.

The equilibrium chelation isotherms of FIG. 4 indicate that slightly more Cu than Ni is chelated per g of PTS. This trend is also evident from comparing the chelation isotherms of Cu (FIG. 2) and Ni (FIG. 3) on PTS. Conditions for FIG. 4 were: temperature=25° C.; dosage=1.0 g chitosan per 100 ml of solution of starting concentration.

Figure 5:
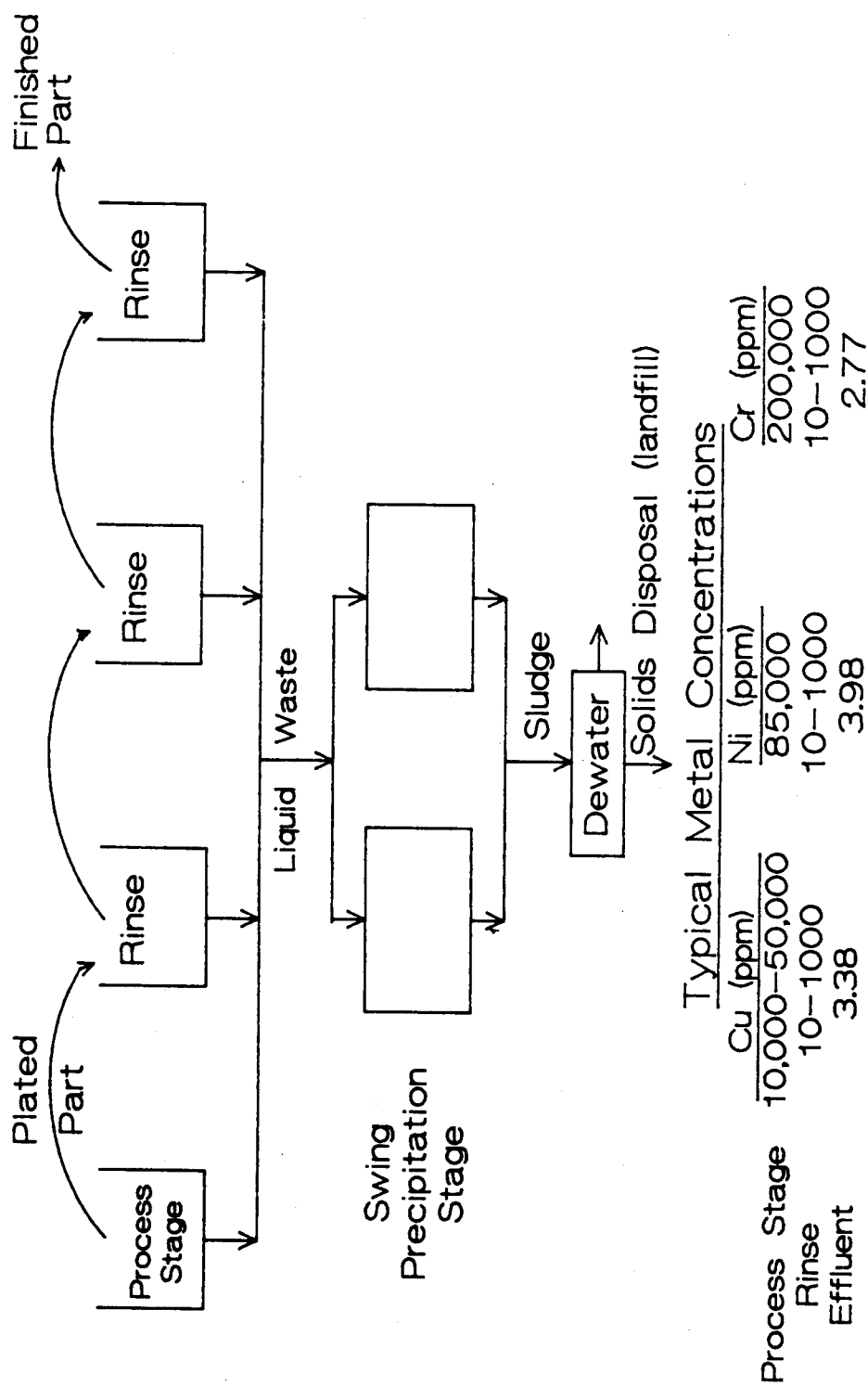
FIG. 5 is a schematic diagram showing the origin of dilute solutions of metal ions from rinsing electroplated parts.

FIG. 5 is a schematic diagram showing the origin of dilute solutions of metal ions from rinsing electroplated parts. Present industrial practice in New England is to remove the metal ions by precipitation before the wastewaters can be discharged. The metal precipitates must be disposed in a lined landfill. The permitted concentrations of Cu, Ni and Cr in the wastewater effluent are shown in FIG. 5. Removal of metal ions by adsorption or chelation on PTS waste as discussed here is contemplated as a substitute treatment process which (by subsequent elution of metal ions) will recycle metal ions to the electroplating process from the wastewater streams.

The usual method of treating plating wastes is to precipitate the metals and bury the precipitate in a suitable landfill. The present inventor has made a preliminary economic analysis in order to compare the cost of conventional precipitation treatment with the costs of a treatment process based on removal by crab shell waste. The basis of comparison is treatment of 500 gal/week of a wastewater containing 1000 ppm of Ni to an effluent concentration of 1 ppm. The results are shown in Table 3.

TABLE 3

Economic Analysis
(in 1987 US dollars)
Basis: 500 gal/month of waste containing 1000 ppm Ni purified to a concentration of 1 ppm

|  | Metal Precipitation | Chelation on Shellwaste |
|---|---|---|
| Investment: | $48,450 | $23,300 |
| Monthly costs: |  |  |
| 1. capital (10% simple interest) | 404 | 194 |
| 2. depreciation (10 yr str line) | 404 | 194 |
| 3. operation and maintenance |  |  |
| a. disposal | 490 | 245 |
| b. chemicals | 441 | 100 |
| c. maintenance | 200 | 97 |
| d. labor | 80 | 80 |
| 4. credit for returned metals | — | −120 |
| Total monthly costs | $2,019 | $790 |

The higher maintenance and capital costs for the precipitation process reflect the use of expensive filtration equipment. A credit for eluted Ni recycled to the electroplating operation is available for the chelation but not the precipitation process. The shellfish waste was assumed to be available at zero cost but the disposal costs of exhausted shellfish waste after ten cycles of chelation/regeneration is included. A simple interest rate of 10% and 10 year straight line depreciation was assumed in the cost analysis. It is evident that chelation by shellfish waste appears to represent a much lower cost method of treatment than the precipitation approach currently employed.

FIG. 6 depicts surface and interior X-ray analysis of a particle of shell treated according to the procedure of the present invention and then used to chelate nickel ions. X-ray analysis of a sample of PTS that had been used to chelate nickel from solution was performed using an energy dispersive spectrometer (EDS). Analysis of the cross section of the particle presents relative proportions of nickel and calcium present. The top portion of FIG. 6 is analysis of the surface of the particle and the bottom portion of FIG. 6 presents the analysis of the center of the particle. The X-ray analysis spectra show that this material contains considerably more calcium in its interior than at its exterior surface, and considerably more nickel at its exterior surface than in its interior. Thus, it can be seen that the mild treatment has not removed calcium from the interior of the particle but did produce sites capable of absorbing nickel at the surface of the particle but not in the interior of the particle. Thus, the product made from shellfish waste has ion exchanging or chelation capacity produced at or near its surface, whereas the interior appears to be substantially unchanged.

The invention now being fully described, it will be apparent to one of ordinary skill in the art that many changes and modifications can be made thereto without departing from the spirit or scope of the invention as set forth herein.

What is claimed as new and desired to be secured by Letters Patent of the United States is:

1. A particle which removes heavy metal ions from aqueous solution, which comprises chitin having formed thereon a layer of chitosan, wherein said particle has a size of from 0.2 to 1.5 cm, and the chitosan layer on the surface thereof has a depth of from about 0.01 micrometers to about 10% of the particle diameter.

2. A particle according to claim 1, wherein the depth of said chitosan layer ranges from 0.01 to 0.1 microns.

3. A chitin particle according to claim 1, which is formed by a process which comprises:
   contacting shellfish waste with a dilute acid for from about ½ to 3 hours, and washing a first time, followed by treating the particles with a basic aqueous solution at 60°–110° C. for from 10 minutes to 3 hours, and washing a second time.

4. The particle according to claim 3, wherein said dilute acid is hydrochloric acid.

5. The particle according to claim 4, wherein said basic aqueous solution is about 30–60% alkali hydroxide.

6. The particle according to claim 5, wherein said chitosan layer is produced by treating said shellfish waste with about 5% HCl for about 1 hour, washing, followed by treating with about 50% sodium hydroxide at about 90° C. for about 1 hour, followed by washing.

7. A packed column for ion exchange or chelation of metal ions, containing therein chitin particles according to claim 1.

8. A method of removing a heavy metal ion from aqueous solution which comprises the steps:
   (a) contacting said aqueous solution containing said metal ion with chitin particles according to claim 1,
   (b) permitting said particles to remove said metal ion from said solution
   (c) separating said solution from said particles.

9. The method of claim 8, wherein the metal ion is selected from the group consisting of $Ni^{2+}$, $Cr^{3+}$, $Hg^{2+}$, $Co^{2+}$, $Ag^+$, $Pb^{2+}$, $Ti^{3+}$, $Fe^{3+}$, $Hg^{2+}$, $Zn^{2+}$, $UO_2^{2+}$, $Mn^{2+}$, $Cr^{6+}$, $Cu^{2+}$ and $Cd^{2+}$.

10. The method of claim 9, wherein said chitin particles are reused a plurality of times by sequentially binding said metal ions to said particles followed by eluting metal ions bound to said particles to regenerate active metal-binding sites.

11. A method of recovering and re-using metal ions from an aqueous waste solution produced by an industrial process, employing particles which comprise chitin having formed thereon a layer of chitosan, comprising the steps:
   (a) removing said metal ions from said waste solution according to claim 8,
   (b) eluting said metal ions from said particles,
   (c) recycling the eluate from step (b) into said industrial process.

12. The method of claim 11 wherein said industrial process is an electroplating process.

* * * * *